United States Patent [19]

Piejko et al.

[11] Patent Number: 5,344,876
[45] Date of Patent: Sep. 6, 1994

[54] MOLDING COMPOUNDS HAVING IMPROVED FIRE BEHAVIOR

[75] Inventors: Karl-Erwin Piejko, Bergisch-Gladbach; Hans-Eberhard Braese; Christian Lindner, both of Cologne, all of Fed. Rep. of Germany

[73] Assignee: Bayer Aktiengesellschaft, Leverkusen, Fed. Rep. of Germany

[21] Appl. No.: 999,451

[22] Filed: Dec. 29, 1992

Related U.S. Application Data

[63] Continuation of Ser. No. 801,425, Dec. 2, 1991, abandoned.

[30] Foreign Application Priority Data

Dec. 13, 1990 [DE] Fed. Rep. of Germany ....... 4093861

[51] Int. Cl.$^5$ .................... C08L 33/08; C08L 51/04; C08L 55/02; C08L 27/18
[52] U.S. Cl. ........................ 525/71; 525/72; 525/199; 524/504; 524/520
[58] Field of Search ............ 525/199, 72, 71

[56] References Cited

U.S. PATENT DOCUMENTS

| | | | |
|---|---|---|---|
| 3,993,621 | 11/1976 | McInerney et al. | 525/199 |
| 4,107,232 | 8/1978 | Haaf et al. | 525/199 |
| 4,579,906 | 4/1986 | Zabrocki et al. | 525/199 |
| 4,877,839 | 10/1989 | Conti-Ramsdin et al. | 525/200 |
| 4,990,406 | 2/1991 | Kappler et al. | 428/422 |

FOREIGN PATENT DOCUMENTS

| | | | |
|---|---|---|---|
| 0163971 | 12/1985 | European Pat. Off. | |
| 0166187 | of 1986 | European Pat. Off. | |
| 178280 | 4/1986 | European Pat. Off. | 525/199 |
| 0320836 | of 1989 | European Pat. Off. | |
| 2758946 | 7/1978 | Fed. Rep. of Germany | 525/199 |
| 3928153 | of 1991 | Fed. Rep. of Germany. | |
| 4000544 | of 1991 | Fed. Rep. of Germany. | |
| 7003940 | 2/1970 | Japan | 525/199 |
| 2199583 | of 1988 | United Kingdom. | |

*Primary Examiner*—Carman J. Seccuro, Jr.
*Attorney, Agent, or Firm*—Connelly & Hutz

[57] ABSTRACT

Molding compounds of acrylate polymers, optionally graft rubbers and/or optionally resin-like vinyl polymers containing 0.05 to 5% by weight tetrafluoroethylene polymers.

6 Claims, No Drawings

MOLDING COMPOUNDS HAVING IMPROVED FIRE BEHAVIOR

This application is a continuation of U.S. application Ser. No. 07/801,425 filed on Dec. 2, 1991, now abandoned.

This invention relates to improved molding compounds of acrylate polymers and, optionally, graft rubbers and/or resin-like vinyl polymers containing tetrafluoroethylene polymers. The blends according to the invention show improved fire behavior.

Soft polymer blends of acrylate polymers and graft rubbers are known (see, for example, DE-OS 3 312 542). Blends which additionally contain other components and which are suitable for the production of flexible ageing-resistant films having a leather-like appearance and which can be produced by calendering and thermoforming, are described in DE-OS 3 811 899 and in DE-OS 3 743 489.

These films exhibit a high property level and are used, for example, for the internal trim of motor vehicles.

For safety reasons, it is desirable in this regard to use substantially non-inflammable films so that any potential fire zone would only spread very slowly. In other words, despite inflammability, the burning rate should be as low as possible. However, additives for improving fire behavior should not adversely affect mechanical properties or produce surface defects, a particularly important requirement where the films are used as leather substitutes.

Typical flameproofing agents or combinations thereof, such as organohalogen compounds, phosphates, aluminium and/or antimony oxides, are added to thermoplastics to improve their fire behavior. It is also known that these compounds are particularly effective in conjunction with tetrafluoroethylene polymers.

U.S. Pat. Ser. No. 4,355,126 for example describes flameproof polyphenylene ether/graft rubber (ABS) molding compounds containing flameproofing agents and polytetrafluoroethylene. EP-A 154 138 describes ABS molding compounds containing tetrafluoroethylene polymers and typical flameproofing agents produced by a special process to avoid surface defects and any deterioration in mechanical properties. The addition of the tetrafluoroethylene polymers improves the flameproofing effect of the flameproofing agents normally used. According to U.S. Pat. Ser. No. 4,355,126 the addition of polytetrafluoroethylene to polyphenylene ether/ABS molding compounds does not itself have a flameproofing effect.

The present invention relates to molding compounds of acrylate polymers, more particularly special crosslinked acrylate copolymers and, optionally, graft rubbers and/or optionally resin-like vinyl monomers containing 0.05 to 5% by weight and preferably 0.25 to 3% by weight tetrafluoroethylene polymers.

The molding compounds according to the invention have a reduced burning rate for otherwise unchanged surfaces and mechanical properties.

Tetrafluoroethylene polymers suitable for the purposes of the invention have fluorine contents of 65 to 76% by weight and preferably 70 to 76% by weight. Examples are polytetrafluoroethylene, tetrafluoroethylene/hexafluoropropylene copolymers or tetrafluoroethylene copolymers containing small quantities of fluorine-free, copolymerizable ethylenically unsaturated monomers. Polymers such as these are known from "Vinyl and Related Polymers", John Wiley & Sons, Inc., New York, 1952, pages 484 to 494; "Fluorpolymers", Wiley-Interscience, New York, 1972; "Encyclopedia of Polymer Science and Technology" Interscience Publishers, New York, Vol. 13, 1970, pages 623 to 654; "Modern Plastics Encyclopedia", 1970 to 1971, Vol. 47, No. 10 A, October 1970, McGraw-Hill, Inc., New York, pages 134, 138 and 774; "Modern Plastics Encyclopedia" 1975 to 1976, October 1975, Vol. 52, No. 10 A, McGraw-Hill, Inc., New York, pages 27, 28 and 472 and U.S. Pat. Ser. Nos. 3,671,487, 3,723,373 and 3,838,092.

Acrylate polymers suitable for the purposes of the invention are homopolymers or interpolymers of at least one $C_{1-8}$ alkyl acrylate (for example methyl, ethyl, propyl, butyl, pentyl, hexyl, 2-ethylhexyl acrylate or alkyl acrylates with the corresponding isomeric $C_{3-8}$ alkyl groups) which may contain up to 50% by weight copolymerized comonomers; suitable comonomers are, for example, vinyl acetate, $C_{1-4}$ alkyl methyl methacrylates, more particularly methyl methacrylate, styrenes, more particularly styrene, acrylonitrile, vinyl ether.

If the acrylate polymers are to be present in at least partly crosslinked form, they are produced in the presence of radical-crosslinking comonomers, more particularly polyfunctional allyl or vinyl compounds. The acrylate polymers are preferably produced by emulsion polymerization.

Particularly preferred acrylate polymers in the context of the invention are particulate, at least partly crosslinked polymers.

Particularly suitable acrylate polymers, graft rubbers and resin-like vinyl polymers are described in DE-OSS 3 312 542 (corresponding to U.S. Pat. No. 4,511,695), 3 811 899 and 3 743 489 DE-OS 3 811 899, corresponding to U.S. Ser. No. 07/329,339, filed Mar. 27, 1989, relates to polymer mixtures of the following components:

a) from 10-60 parts by weight, in particular from 20-50 parts by weight, of a graft polymer comprising:
   a1) mixtures of from 20-40% by weight of acrylonitrile and 80-60% by weight of styrene, α-methylstyrene, alkylmethacrylate or mixtures thereof, or
   a2) methylmethacrylate, optionally mixed up with 30% by weight of styrene, acrylonitrile and/or alkylacrylate, on
   a3) a particulate, highly cross-linked alkylacrylate rubber with an average particle diameter ($d_{50}$) of from 100 to 800 nm which may contain up to 30% by weight of dienes, the graft polymers (a) having rubber contents of from 30-70% by weight, preferably from 45-65% by weight, most preferably from 50-60% by weight;

b) from 10-50 parts by weight, in particular from 10-40 parts by weight, of an at least partially cross-linked rubber-like copolymer of from 5-40% by weight of acrylonitrile, styrene, alkylmethacrylate or mixtures thereof and from 95-60% by weight of alkylacrylate and small amounts of a cross-linking monomer having a gel content of from 20-99% by weight, a swelling index above 10 determined in dimethylformamide at 23° C. and an average particle diameter ($d_{50}$) of from 100-600 nm, in particular from 100-300 nm;

c) from 5-80, preferably from 5-60, most preferably from 10-49, parts by weight of an uncross-linked polymer of styrenes, α-methylstyrenes, acrylonitrile, methacrylonitrile, esters of (meth)acrylic acid, vinyl $C_1$-$C_4$-carboxylic acids or mixtures of these monomers having Staudinger indices of from 0.3 to 1.5 dl/g (determined in toluene at 23° C.); and d) from 0–30, in particular from 5–25, parts by weight of a graft polymer comprising;

d1) methylmethacrylate and optionally up to 30% by weight of styrene, acrylontrile and/or alkylacrylate, or d2) a mixture of from 20–35% by weight of acrylonitrile and from 80–65% by weight of styrene, α-methylstyrene, alkylmethacrylate or mixtures thereof, on d3) a particulate, highly cross-linked alkylacrylate rubber which may contain up to 30% by weight of diene and has an average particle diameter ($d_{50}$) of from 100–800 nm, the graft polymer (d) having a rubber content of from 70–90% by weight. The polymers of cyclic aliphatic esters and carbonates described in DE-OS 3 841 669 and/or the polyesters containing carbonate groups described in DE-OS 3 918 405 may be present as further constituents in the molding compounds according to the invention. Molding compounds according to the invention containing only acrylate-based graft rubbers as the graft rubbers are preferred. Other preferred molding compounds contain resin-like vinyl polymers. Molding compounds containing only acrylate-based graft rubbers as the graft rubbers and resin-like vinyl polymers are particularly preferred. Graft rubbers as disclosed in U.S. Pat. No. 4,511,695 are the graft product of a mixture of from 20 to 40 parts by weight of acrylonitrile and from 80 to 60 parts by weight of styrene, α-methylstyrene, methylmethacrylate or mixtures thereof on a particulate, highly cross-linked diene or alkyl acrylate rubber having an average particle diameter ($d_{50}$) of from 0.1 to 2.0 μm, the total rubber content amounting to between 20 and 50% by weight.

Preferred molding compounds are characterized in that, for their production, an aqueous dispersion of the tetrafluoroethylene polymer(s) is mixed with parts of one or more of the latices of the acrylate polymers, graft rubbers or resin-like vinyl polymers, the polymer mixture is isolated and optionally mixed with the remaining separately isolated components in the usual way, optionally with addition of typical auxiliaries, such as for example lubricants, antioxidants, antistatic agents and colorants. The mixtures may be mixed with the components in typical mixers, such as kneaders, extruders, rolls or screws.

The polymer mixture is isolated from the latex mixture, for example, by coagulation, filtration and subsequent drying or by direct spray drying or by other known methods.

The molding compounds according to the invention may also contain typical flameproofing agents, such as for example organohalogen compounds, phosphates, aluminium or antimony oxides or mixtures of these compounds in the usual concentrations.

EXAMPLES

I Preparation of polytetrafluoroethylene/graft rubber blends:

IA A latex of a polytetrafluoroethylene (Hostaflon TF 5032®, a product of Hoechst AG) containing 70.5% by weight fluorine (based on solids) is mixed with a latex of an acrylate graft rubber (constituent a1 of DE-OS 3 811 899) in a ratio of 10:90 (based on solids) and the resulting mixture is worked up to a powder by coagulation with an aqueous magnesium sulfate solution.

1. Acrylate rubber latex 1 as graft base 17,232 Parts by weight water and 588 parts by weight of a polybutadiene rubber latex having a polymer solids content of 42% by weight and an average particle diameter ($d_{50}$) of 140 nm. After heating to 63° C., a solution of 49.2 parts by weight potassium peroxodisulfate and 1,152 parts by weight water is added. The following mixtures are then introduced into the reactor over a period of 5 hours at 63° C.:

| | Solution 1: |
|---|---|
| 36,000 | parts by weight n-butyl acrylate |
| 81.6 | parts by weight triallyl cyanurate |
| | Solution 2: |
| 40,800 | parts by weight water |
| 384 | parts by weight $C_{14-18}$ alkyl sulfonic acid Na salt |

The mixture is then left to polymerize for 4 hours at 63° C. An emulsion having a polymer solids content of 37% by weight is obtained. The average latex particle diameter ($d_{50}$) is 480 nm. The polymer as a gel content of 93% by weight.

IB A latex of a polytetrafluoroethylene (Hostaflon TF 5032®, a product of Hoechst AG) containing 70.5% by weight fluorine (based on solids) is mixed with a latex of a butadiene graft rubber prepared by polymerization of 70% by weight of a mixture of 72% by weight styrene and 28% by weight acrylonitrile onto 30% by weight of a crosslinked polybutadiene latex having an average particle diameter of 380 nm in a ratio of 10:90 (based on solids) and the resulting mixture is worked up to a powder by coagulation with an aqueous magnesium sulfate solution.

II Production of the molding compounds according to the invention

IIA A molding compound is produced in accordance with DE-OS 3 811 899 from 45% by weight of the acrylate graft rubber described therein (component al of DE-OS 3 811 899), 40% by weight of a crosslinked butyl acrylate/acrylonitrile copolymer (component b of DE-OS 3 811 899) and 15% by weight of a styrene/acrylonitrile resin (component c of DE-OS 3 811 899).

Component al of DE-OS 3 811 899:

734 Parts by weight water and 4,784 parts by weight acrylate rubber latex 1 are introduced into a reactor. After 30 minutes, the reactor is purged with nitrogen and heated to 70° C. The following solution is added with stirring:

| Solution 1: |
|---|
| 190 parts by weight water |
| 6 parts by weight potassium peroxodisulfate |
| 3 parts by weight Na salt of $C_{14-18}$ alkyl sulfonic acids |

Solutions 2 and 3 are then introduced into the reactor simultaneously over a period of 5 hours at 70° C.

| Solution 2: |
|---|
| 850 parts by weight styrene |
| 330 parts by weight acrylonitrile |
| Solution 3: |
| 1,500 parts by weight water |

-continued 20 parts by weight Na salts of $C_{14-18}$ alkyl sulfonic acids

The mixture is left to polymerize for 4 hours at 70° C. An emulsion having a polymer solids content of 35% by weight is obtained. The rubber content of the polymer is 60% by weight.

Component b of DE-OS 3 811 899:

A solution of 2.5 parts by weight of the Na salt of $C_{14-18}$ alkyl sulfonic acids and 750 parts by weight water is introduced with stirring into a reactor. After heating to 70° C., 79 parts by weight monomer solution A) are added and the polymerization is initiated by addition of a solution of 3.5 parts by weight potassium peroxodisulfate in 50 parts by weight water. The rest of solution A) and solution B) are then simultaneously introduced into the reactor over a period of 6 hours at 70° C. and polymerization is completed over a period of 4 hours. A latex having a polymer solids content of 38% by weight for an average particle diameter ($d_{50}$) of 180 nm and a gel content (in dimethyl formamide at 23° C.) of 98% by weight is obtained.

Solution A:
1,105 parts by weight n-butyl acrylate
7 parts by weight triallyl cyanurate
474 parts by weight acrylonitrile Solution B:
30 parts by weight Na salt of $C_{14-18}$ alkyl sulfonic acids
1,790 parts by weight water.

Component C of DE-OS 3 811 899:

A solution of 6 parts by weight disproportionated abietic acid and 4 parts by weight 1-normal sodium hydroxide in 3,080 parts by weight water is introduced into a reactor and, after purging with nitrogen, the contents of the reactor are heated to 70° C. 200 Parts by weight solution A are added with stirring and the polymerization is initiated by addition of a solution of 8 parts by weight potassium peroxodisulfate in 200 parts by weight water. The rest of solution A and solution B are uniformly introduced into the reactor over a period of 5 hours at 70° C. The mixture is left to polymerize for 4 hours at 70° C. An emulsion having a polymer solids content of 33% by weight is obtained. The isolated polymer has an intrinsic index ($\eta$) of 0.7 dl/g (in dimethyl formamide at 23° C.).

Solution A:
1,944 parts by weight styrene
756 parts by weight acrylonitrile
26 parts by weight tert.-dodecyl mercaptan Solution B:
54 parts by weight disproportionated abietic acid
40 parts by weight 1-normal sodium hydroxide
2,050 parts by weight water IIB A molding compound of 56% by weight of an ABS graft polymer prepared by polymerization of 70% by weight of a mixture of 72% by weight styrene and 28% by weight acrylonitrile onto 30% by weight of a crosslinked polybutadiene latex, average particle size 380 nm, and 44% by weight of the crosslinked butyl acrylate/acrylonitrile copolymer from IIA is produced in the same way as in IIA.

Examples 1 to 3 and Comparison Example 4

Mixture IA is added to molding compound IIA on a roller in such quantities by weight that the polytetrafluoroethylene contents shown in the Table are obtained. 0.3 part by weight Loxiol G70 ® (high molecular weight, polyfunctional fatty acid ester of Henkel KGaA) and 5 parts by weight of a polycaprolactone ($\overline{M}_w$ 40,000) are also added per 100 parts by weight of the resulting mixture.

The percentage contents of polytetrafluoroethylene in the molding compounds and the test results are shown in the following Table.

TABLE

Composition of molding compounds IIA and test results

| Example No. | Polytetrafluoroethylene content [% by weight] | Burning rate US FMVSS No. 302 [mm/min.] | Tensile strength DIN 53455 [MPa] | Elongation DIN 53455 [%] | Shore hardness DIN 53505 A/D |
|---|---|---|---|---|---|
| 1 | 0.5 | 32 | 18.2 | 242 | 94/38 |
| 2 | 1.0 | 27 | 18.3 | 244 | 94/39 |
| 3 | 1.5 | 27 | 18.2 | 237 | 95/39 |
| 4 Comparison | — | 64 | 18.1 | 242 | 95/40 |

Example 5 and Comparison Example 6

10 Parts by weight mixture IB (Example 5) and 10 parts by weight of the corresponding ABS graft polymer without polytetrafluoroethylene (comparison Example 6) are added to molding compound IIB on mixing rolls. 0.3 Part by weight Loxiol G70 ® (high molecular weight, polyfunctional fatty acid ester of Henkel KGaA) is additionally added per 100 parts by weight of the resulting mixture.

| Example No. | Polytetrafluoroethylene content [% by weight] | Burning rate US FMVSS No. 302 [mm/min.] |
|---|---|---|
| 5 | 1.0 | 35 |
| 6 (Comparison) | — | 61 |

Compared with the comparison molding compounds without polytetrafluoroethylene (Comparison Examples 4 and 6), molding compounds 1 to 3 and 5 according to the invention show a distinctly reduced burning rate for otherwise unchanged mechanical properties. The surfaces of the test specimens are free from defects.

We claim:

1. A molding compound which consists of:
   A. an acrylate polymer prepared from at least one $C_{1-8}$ alkyl acrylate and optionally up to 50% by weight of monomers selected from the group consisting of $C_{1-4}$ alkyl methacrylates, styrene, or acrylonitrile in the presence of a polyfunctional vinyl or allyl crosslinking comonomer, which acrylate polymer is particulate and is at least partially crosslinked and is not grafted,
   B. from 1 to 5% by weight of tetrafluoroethylene polymers, based on weight of molding compound, the tetrafluoroethylene polymers having a fluorine content of 65 to 76% by weight, said molding compound optionally additionally containing C. a graft rubber selected from acrylate-based graft rubber and/or ABS graft rubber, D. a styrene/acrylonitrile resin, and/or E. lubricants, antioxidants, antistatic agents, colorants and flameproofing agents.

2. The molding compound of claim 1 containing both an ABS graft rubber and an acrylate-based graft rubber.

3. The molding compound of claim 2 additionally containing a styrene/acrylonitrile resin.

4. A film prepared from the molding compound of claim 1.

5. A film prepared from the molding compound of claim 2.

6. A film prepared from the molding compound of claim 3.

* * * * *